United States Patent

Degen et al.

[11] Patent Number: 5,382,263
[45] Date of Patent: Jan. 17, 1995

[54] BLUE DYE MIXTURES OF HIGH BRILLIANCE

[75] Inventors: Helmut Degen, Frankenthal; Arno Lange, Bad Duerkheim; Sabine Gruettner-Merten, Mutterstadt; Helmut Reichelt, Neustadt, all of Germany

[73] Assignee: BASF Aktiengesellschaft, Ludwigshafen, Germany

[21] Appl. No.: 946,652

[22] Filed: Sep. 18, 1992

[30] Foreign Application Priority Data

Sep. 26, 1991 [DE] Germany .................. 4132075

[51] Int. Cl.$^6$ .................. C09B 29/03; C09B 67/22
[52] U.S. Cl. ........................ 8/638; 8/639; 8/643
[58] Field of Search .................. 8/639, 643

[56] References Cited

U.S. PATENT DOCUMENTS

| | | | |
|---|---|---|---|
| 2,628,963 | 2/1953 | Laucius et al. | 8/675 |
| 3,326,934 | 6/1967 | Akamatsu et al. | 548/426 |
| 3,668,219 | 6/1972 | Otsuka et al. | 548/426 |
| 3,835,154 | 9/1974 | Putzig | 8/532 |
| 4,881,943 | 11/1989 | Brierley et al. | 8/662 |
| 4,908,041 | 3/1990 | Hahn et al. | 8/638 |

OTHER PUBLICATIONS

Chemical Abstracts, An 148078q, vol. 89, No. 9, Oct. 30, 1978, & JP-A-7 861 781, Jun. 2, 1978, K. Sato, et al., "Dyeing Hydrophobic Fibers".

*Primary Examiner*—Paul Lieberman
*Assistant Examiner*—Necholus Ogden
*Attorney, Agent, or Firm*—Oblon, Spivak, McClelland, Maier & Neustadt

[57] ABSTRACT

Blue dye mixtures useful for dyeing or printing polyester fabrics contain from 30 to 95% by weight, based on the total weight of the dyes, of one or more dyes based on 1,4-diaminoanthraquinone-2,3-dicarboximides and also from 5 to 70% by weight based on the total weight of the dyes, of one or more thiopheneazo dyes having a coupling component of the aniline series.

3 Claims, No Drawings

BLUE DYE MIXTURES OF HIGH BRILLIANCE

The present invention relates to novel blue dye mixtures containing from 30 to 95% by weight, based on the total weight of the dyes, of one or more anthraquinone dyes of the formula I

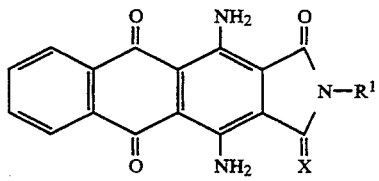

where
- $R^1$ is $C_1$–$C_{10}$-alkyl optionally interrupted by 1 or 2 oxygen atoms in ether function and optionally substituted by $C_1$–$C_8$-alkoxycarbonyl, hydroxyl or phenyl, and
- X is oxygen or imino, and also from 5 to 70% by weight, based on the total weight of the dyes, of one or more thiopheneazo dyes of the formula II

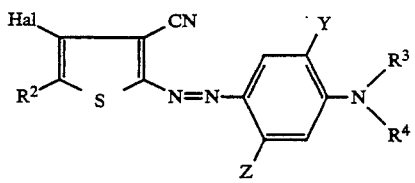

where
- Hal is chlorine or bromine,
- $R^2$ is formyl or cyano,
- Y is hydrogen or $C_1$–$C_4$-alkoxy,
- Z is $C_1$–$C_4$-alkyl, $C_1$–$C_4$-alkoxy, optionally halogen-, cyano-, hydroxyl-, $C_1$–$C_4$-alkoxy- or $C_1$–$C_4$-alkanoyloxy-substituted $C_1$–$C_8$-alkanoylamino or $C_3$–$C_4$-alkenoylamino, and
- $R^3$ and $R^4$ are identical or different and each is independently of the other hydrogen or $C_1$–$C_6$-alkyl optionally substituted by hydroxyl, $C_1$–$C_4$-alkoxy or $C_1$–$C_4$-alkanoyloxy, and also to the use thereof for dyeing or printing polyester fabrics.

It is known that anthraquinone dyes, for example C.I. Disperse Blue 60 (61 104) or C.I. Disperse Blue 87, are inferior in color strength and buildup to azo dyes.

Despite these disadvantages, blue anthraquinone dyes of the type of C.I. Disperse Blue 60 have hitherto not been displaced in practice by azo dyes. The reason for this is that azo dyes do not have the brilliance of these anthraquinone dyes. Also, mixtures of such anthraquinone dyes with azo dyes are duller.

The brilliance of a dyeing—and hence of a dye—is customarily defined in colorimetric terms using the CIELAB formula (DIN 6174). For a greenish to neutral blue dye to be termed brilliant its dyeings must have a chroma value of above 39.

It is an object of the present invention to provide novel mixtures of anthraquinone and azo dyes suitable for dyeing or printing polyesters in the blue region with virtually the same brilliance as anthraquinone dyes alone.

We have found that this object is achieved by the blue dye mixtures defined at the beginning.

Any alkyl appearing in the abovementioned formulae I and II may be either straight-chain or branched.

Any substituted alkyl is in general monosubstituted or disubstituted.

$R^1$ is for example methyl, ethyl, propyl, isopropyl, butyl, isobutyl, sec-butyl, tert-butyl, pentyl, isobutyl, neopentyl, tert-pentyl, hexyl, 2-methylpentyl, heptyl, 2-methylhexyl, octyl, 2-ethylhexyl, nonyl, decyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-isopropoxypropyl, 2- or 3-butoxypropyl, 2- or 4-methoxybutyl, 2- or 4-ethoxybutyl, 3,6-dioxaheptyl, 3,6-dioxaoctyl, 4,7-dioxaoctyl, 4,7-dioxanonyl, 2-hydroxyethyl, 2- or 3-hydroxypropyl, 2- or 4-hydroxybutyl, 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-isopropoxycarbonylpropyl, 2- or 3-butoxycarbonylpropyl, 2- or 4-methoxycarbonylbutyl, 2- or 4-ethoxycarbonylbutyl, benzyl, 1- or 2-phenylethyl, 3-phenylpropyl or 2,3-diphenylpropyl.

Y and Z in the formula II are each for example methoxy, ethoxy, propoxy, isopropoxy, butoxy, isobutoxy or sec-butoxy.

Z may in addition be for example, like $R^3$ and $R^4$, methyl, ethyl, propyl, isopropyl, butyl, isobutyl or sec-butyl.

Z may also be for example acetylamino, propionylamino, butyrylamino, isobutyrylamino, 2-ethylhexanoylamino, methoxyacetylamino, ethoxyacetylamino, 2- or 3-methoxypropionylamino, chloroacetylamino, cyanoacetylamino, hydroxyacetylamino, acetyloxyacetylamino, acryloylamino or methacryloylamino.

$R^3$ and $R^4$ may each also be for example pentyl, isopentyl, neopentyl, hexyl, 2-hydroxyethyl, 2- or 3-hydroxypropyl, 2- or 4-hydroxybutyl, 2-methoxyethyl, 2-ethoxyethyl, 2- or 3-methoxypropyl, 2- or 3-ethoxypropyl, 2- or 4-methoxybutyl, 2- or 4-ethoxybutyl, 2-acetyloxyethyl or 2- or 3-acetyloxypropyl.

Preference is given to those dye mixtures containing one or more dyes of the formula I where
- $R^1$ is $C_1$–$C_8$-alkyl or in particular $C_1$–$C_8$-alkyl interrupted by 1 or 2 oxygen atoms in the ether function, and
- X is oxygen, and also one or more dyes of the formula II where
- Hal is chlorine,
- $R^2$ is formyl or cyano,
- Y is hydrogen,
- Z is $C_1$–$C_4$-alkyl or optionally methoxy- or ethoxy-substituted acetylamino or propionylamino, and
- $R^3$ and $R^4$ are each independently of the other $C_1$–$C_4$-alkyl optionally substituted by hydroxyl or $C_1$–$C_4$-alkoxy.

Preference is also given to dye mixtures containing from 50 to 85% by weight, based on the total weight of the dyes, of one or more anthraquinone dyes of the formula I and also from 15 to 50% by weight, based on the total weight of the dyes, of one or more thiopheneazo dyes of the formula II.

Particular preference is given to dye mixtures containing from 60 to 80% by weight, based on the total weight of the dyes, of one or more anthraquinone dyes of the formula I and also from 20 to 40% by weight, based on the total weight of the dyes, of one or more thiopheneazo dyes of the formula II.

Of particular importance are dye mixtures containing one or two anthraquinone dyes of the formula I and two thiopheneazo dyes of the formula II.

The dyes of the formulae I and II are in general known dyes. Dyes of the formula I are described for example in U.S. Pat. Nos. 2,628,963, 3,835,154, DE-B-1 266 425 or DE-A-2 016 794. Dyes of the formula II are known for example from EP-A-201 896.

The dye mixtures of the invention are prepared in a conventional manner, for example by mixing the particular components in the stated weight ratio. The novel mixtures may if desired include further components, for example dispersants. It is also possible to mix ready-produced preparations of the particular dyes or ready-produced dye preparations with pure dyes.

The novel dye mixtures are suitable for dyeing or printing, for example, cellulose acetate or in particular polyester fabrics. The dyeings or prints obtained have a blue shade. The dyeing and printing methods are known per se. Further details may also be found in the Examples.

What is surprising is that the dye mixtures of the invention have the same or in some instances even a higher brilliance than the anthraquinone dyes alone. The novel dye mixtures also have the favorable fastness profile and the advantageous dyeing properties of anthraquinone dyes, especially the light fastness and the reduction stability. Compared with the pure anthraquinone dyes, the novel dye mixtures have a higher yield and better buildup properties.

The Examples which follow will further illustrate the invention.

Dyeing method 10 g of polyester fabric are introduced at 50° C. into 200 ml of a dyeing liquor containing Q % by weight, based on weight of fiber, of one or more dye preparations and whose pH has been adjusted to 4.5 with acetic acid. After 5 minutes at 50° C. the liquor is heated over 30 minutes to 130° C., maintained at that temperature for 60 minutes and then over 20 minutes cooled back down to 60° C.

Then the dyed polyester fabric is reduction cleared by treating it at 65° C. for 15 minutes in 200 ml of a liquor containing 5 ml/l of 32% by weight sodium hydroxide solution, 3 g/l of sodium dithionite and 1 g/l of an addition product of 48 mol of ethylene oxide with 1 mol of castor oil. Finally, the fabric is rinsed, neutralized with dilute acetic acid, rinsed once more and dried.

The abovementioned dye preparations contain in each case 22.5% by weight of anthraquinone dye and 40% by weight of azo dye, each percentage being based on the weight of the preparation.

The dyeings described below in the Examples 1 to 3 all have the same depth of shade.

EXAMPLE 1

| Mixture components | % by weight of dye preparation, on weight of polyester fiber | | | | | | | | |
|---|---|---|---|---|---|---|---|---|---|
| Anthraquinone dye with N—C$_3$H$_6$OCH$_3$ | 1.80 | 1.71 | 1.62 | 1.44 | 0.975 | 0.65 | 0.32 | 0.155 | 0 |
| Anthraquinone dye with N—C$_3$H$_6$OC$_2$H$_4$OCH$_3$ | 1.80 | 1.71 | 1.62 | 1.44 | 0.975 | 0.65 | 0.32 | 0.155 | 0 |
| Thiopheneazo dye (Cl, CN, OHC, S, N=N, NH—CO—CH$_2$OCH$_3$, N(C$_2$H$_5$)$_2$) | 0 | 0.025 | 0.05 | 0.10 | 0.18 | 0.27 | 0.35 | 0.39 | 0.42 |
| Chroma (C) to CIELAB (DIN 6174) | 40.45 | 40.56 | 40.37 | 39.92 | 39.54 | 38.49 | 37.71 | 37.10 | 36.25 |
| Hue (H) to CIELAB (DIN 6174) | 258.13 | 257.92 | 257.59 | 257.57 | 256.23 | 256.90 | 258.53 | 259.59 | 261.23 |

EXAMPLE 2

| Mixture components | % by weight of dye preparation, on weight of polyester fiber | | | | | | | | |
|---|---|---|---|---|---|---|---|---|---|
| Anthraquinone dye with N—C$_3$H$_6$OCH$_3$ | 1.80 | 1.71 | 1.62 | 1.44 | 0.975 | 0.65 | 0.32 | 0.155 | 0 |

EXAMPLE 2

| Mixture components | % by weight of dye preparation, on weight of polyester fiber | | | | | | | | |
|---|---|---|---|---|---|---|---|---|---|

Anthraquinone dye with $N-C_3H_6OC_2H_4OCH_3$ substituent (1,4-diamino anthraquinone imide structure):

| | 1.80 | 1.71 | 1.62 | 1.44 | 0.975 | 0.65 | 0.32 | 0.155 | 0 |

Thiophene azo dye (Cl, CN, OHC-S-, =N-N-phenyl-N(C₂H₅)₂ with NH-CO-CH₃):

| | 0 | 0.023 | 0.045 | 0.09 | 0.16 | 0.24 | 0.32 | 0.35 | 0.40 |

| Chroma (C) to CIELAB (DIN 6174) | 40.45 | 40.62 | 40.45 | 40.15 | 40.32 | 39.77 | 39.10 | 38.94 | 37.73 |
| Hue (H) to CIELAB (DIN 6174) | 258.13 | 258.35 | 258.59 | 259.21 | 259.56 | 261.75 | 265.03 | 267.94 | 272.40 |

EXAMPLE 3

| Mixture components | % by weight of dye preparation, on weight of polyester fiber | | | | | |
|---|---|---|---|---|---|---|

Anthraquinone dye with $N-C_3H_6OCH_3$ substituent:

| | 1.8 | 1.7 | 1.62 | 1.44 | 0.975 | 0.65 |

Anthraquinone dye with $N-C_3H_6OC_2H_4OCH_3$ substituent:

| | 1.8 | 1.7 | 1.62 | 1.44 | 0.975 | 0.65 |

Thiophene azo dye (Cl, CN, OHC-S-, =N-N-phenyl-N(C₂H₅)₂ with NH-CO-CH₂OCH₃):

| | 0 | 0.012 | 0.025 | 0.05 | 0.09 | 0.13 |

Thiophene azo dye (Cl, CN, OHC-S-, =N-N-phenyl-N(C₂H₅)₂ with NH-CO-CH₃):

| | 0 | 0.011 | 0.023 | 0.45 | 0.08 | 0.12 |

| Chroma (C) to CIELAB (DIN 6174) | 40.6 | 40.6 | 40.4 | 40.0 | 39.7 | 39.1 |
| Hue (H) to CIELAB (DIN 6174) | 258.0 | 257.9 | 258.3 | 258.4 | 257.7 | 259.3 |

Similarly favorable mixtures are obtained on using the dyes listed below in Tables 1 and 2.

| | | |
|---|---|---|
| 4 | NH | $C_3H_6OCH_3$ |
| 5 | O | $C_2H_4-COOC_4H_9$ |
| 6 | O | $C_3H_6OC_2H_5$ |
| 7 | NH | $CH(CH_3)C_2H_5$ |
| 8 | O | $CH(CH_3)C_2H_5$ |
| 9 | NH | $C_2H_4OC_2H_5$ |
| 10 | NH | $C_2H_4OC_4H_9$ |

TABLE 2

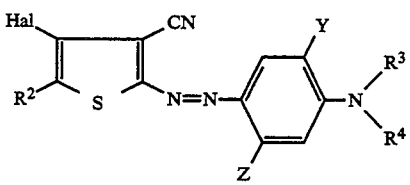

| Ex. No. | Z | $R^3$ | $R^4$ |
|---|---|---|---|
| 11 | $NHCOC_2H_5$ | $C_2H_5$ | $C_2H_5$ |
| 12 | $NHCOCH_3$ | $C_4H_9$ | $C_4H_9$ |
| 13 | $NHCOC_2H_5$ | $C_4H_9$ | $C_4H_9$ |
| 14 | $NHCOCH_3$ | $C_3H_7$ | $C_3H_7$ |
| 15 | $NHCOC_3H_7$ | $C_4H_9$ | $C_4H_9$ |
| 16 | $NHCOCH_2Cl$ | $C_2H_5$ | $C_2H_5$ |
| 17 | $NHCOCH(CH_3)OCH_3$ | $C_2H_5$ | $C_2H_5$ |
| 18 | $NHCOCH(CH_3)_2$ | $C_2H_5$ | $C_2H_5$ |
| 19 | $NHCOCH_3$ | $C_2H_5$ | $C_4H_9$ |
| 20 | $NHCOCH_2OCOCH_3$ | $C_2H_5$ | $C_2H_5$ |
| 21 | $NHCOCH_2OC_2H_5$ | $C_2H_5$ | $C_2H_5$ |
| 22 | $NHCOCH(C_2H_5)C_4H_9$ | $C_2H_5$ | $C_2H_5$ |
| 23 | $NHCOCH=CH_2$ | $C_2H_5$ | $C_2H_5$ |
| 24 | $NHCOC(CH_3)=CH_2$ | $C_2H_5$ | $C_2H_5$ |
| 25 | $NHCOCH_3$ | $C_2H_4OC_2H_5$ | $C_2H_4OC_2H_5$ |
| 26 | $NHCOCH_3$ | $C_2H_5$ | $C_2H_4OCH_3$ |

We claim:

1. A blue dye mixture containing from 30 to 95% by weight, based on the total weight of the dyes, of one or more blue anthraquinone dyes of the formula I

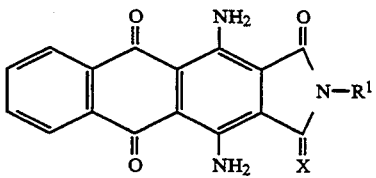

where
$R^1$ is $C_1-C_{10}$-alkyl optionally interrupted by 1 or 2 oxygen atoms in ether function and optionally substituted by $C_1-C_8$-alkoxycarbonyl, hydroxyl or phenyl, and
X is oxygen or imino,
and also from 5 to 70% by weight, based on the total weight of the dyes, of one or more blue thiopheneazo dyes of the formula II $$\text{(II)}$$

where
Hal is chlorine or bromine,
$R^2$ is formyl or cyano,
Y is hydrogen or $C_1-C_4$-alkoxy,
Z is $C_1-C_4$-alkyl, $C_1-C_4$-alkoxy, optionally halogen-, cyano-, hydroxyl-, $C_1-C_4$-alkoxy- or $C_1-C_4$-alkanoyloxy-substituted $C_1-C_8$-alkanoylamino or $C_3-C_4$-alkenoyl-amino, and
$R^3$ and $R^4$ are identical or different and each is independently of the other hydrogen or $C_1-C_6$-alkyl optionally substituted by hydroxyl, $C_1-C_4$-alkoxy or $C_1-C_4$-alkanoyloxy.

2. A blue dye mixture as claimed in claim 1, containing from 50 to 85% by weight, based on the total weight of the dyes, of one or more anthraquinone dyes of the formula I and also from 15 to 50% by weight, based on the total weight of the dyes, of one or more thiopheneazo dyes of the formula II.

3. A method comprising dyeing or printing polyester fabrics with the blue dye mixture of claim 1.

* * * * *